United States Patent
Tat et al.

(10) Patent No.: US 6,298,225 B1
(45) Date of Patent: *Oct. 2, 2001

(54) RADIO TELEPHONES AND METHOD OF OPERATION

(75) Inventors: Nguyen Quan Tat, Hampshire; Alan Dowell, Surrey, both of (GB)

(73) Assignee: Nokia Mobile Phones Limited, Salo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/786,709

(22) Filed: Jan. 21, 1997

(30) Foreign Application Priority Data

Jan. 31, 1996 (GB) .................................. 9601942

(51) Int. Cl.[7] ........................................ H04J 3/06
(52) U.S. Cl. ................... 455/220; 455/130; 455/296
(58) Field of Search ................... 455/502, 237, 455/343, 220, 550, 130, 296; 375/356, 357; 370/503

(56) References Cited

U.S. PATENT DOCUMENTS

| 5,084,891 | * | 1/1992 | Ariyavisitakul et al. | 371/42 |
| 5,490,286 | * | 2/1996 | Kah, Jr. | 455/502 |
| 5,515,401 | * | 5/1996 | Takenaka et al. | 375/344 |
| 5,519,717 | * | 5/1996 | Lorenzo | 375/202 |
| 5,530,704 | * | 6/1996 | Gibbons et al. | 370/94.2 |
| 5,561,852 | * | 10/1996 | Heeschen et al. | 455/502 |
| 5,636,208 | * | 6/1997 | Chang et al. | 370/347 |
| 5,737,330 | * | 4/1998 | Fulthorp et al. | 370/346 |

FOREIGN PATENT DOCUMENTS

| 0292966 | 11/1988 | (EP) . |
| 0 411 538 A2 | 2/1991 | (EP) . |
| 0 507 443 A2 | 10/1992 | (EP) . |
| 0513710 | 11/1992 | (EP) . |
| 0 550 169 A1 | 7/1993 | (EP) . |
| 2 135 855 A | 9/1984 | (GB) . |
| 2 255 691 A | 11/1992 | (GB) . |
| 8-8810 | 1/1996 | (JP) . |

OTHER PUBLICATIONS

Patent Abstracts of Japan, Publication No. 08008810, Jan. 12, 1996, 1 page.

* cited by examiner

Primary Examiner—Daniel Hunter
Assistant Examiner—Thuan T. Nguyen
(74) Attorney, Agent, or Firm—Perman & Green, LLP (57) ABSTRACT

A radio receiver operable for communication in a radio system in which information is transmitted on respective channels in bursts. Each burst has a field for enabling the radio receiver to synchronise therewith. The radio receiver has an adjustable internal clock for timing receiving signals. Adjustment of the internal clock can be suspended if an error field in a received signal indicates that a signal received is not a valid burst.

20 Claims, 6 Drawing Sheets

R-CRC: IS A 16 BIT CRC STORED IN BITS a48–a63 CARRIED OUT ON THE 48 OTHER BITS IN THE A-FIELD a0–a47

X-CRC: IS A 4 BIT CRC STORED IN BITS b320–b323 CARRIED OUT ON THE LAST 16 BITS OF EACH B-SUBFIELD, THE 80 BITS THAT ARE:– b48–b63
b112–b127
b176–b191
b240–b255
b304–b323

Z-FIELD BITS: ARE A REPEAT OF THE X-CRC BITS

RADIO TELEPHONES AND METHOD OF OPERATION

BACKGROUND OF THE INVENTION

The invention relates to radio receivers operable for communication in a radio system in which information is transmitted in bursts at periodic intervals in accordance with a system clock, a burst having a field enabling the radio receiver to synchronise therewith. Particularly, but not exclusively, the invention relates to such telephones for communication with base stations in a digital cellular radio telephone system employing transmission by a plurality of carrier frequencies in frames, such as TDMA frames, each consisting of a predetermined number of time slots.

In a radio telephone system, a handset must be in contact with the infrastructure of the system in order for it to make and receive calls. In order to communicate with the system, a handset must be listening to signals transmitted by the system and respond to those signals in an appropriate manner. Typically radio telephone systems allocate a plurality of channels for transmitting and receiving information.

In order to be in a position to make and receive calls the handset must monitor the system to be able to receive and decode messages transmitted. Once the handset has located a suitable channel for monitoring system information and perhaps indicated its presence, a periodic monitoring of the system information is sufficient to locate paging signals used to alert a handset to an incoming call. In this condition the handset is determined to be 'locked on' or in 'idle lock'.

Communication channels will typically have a predetermined frequency and in TDMA systems will also be allocated a specific time slot for communication. It is important that a handset is able to transmit and receive information at appropriate times in order for the information to be decoded by a receiver. The process of determining the appropriate time for receiving and transmitting signals is known as synchronisation.

In digital systems, information is typically transmitted in bursts. The information in each burst is formed from a number of bits. The information derived depends on both the bit value and the position of a particular bit within a burst. To achieve synchronisation and be able to receive and transmit information, the handset must transmit and receive signals at appropriate times. This necessitates achieving both bit and burst synchronisation for transmitting and receiving. Bit synchronisation for receiving a transmitted signal involves locating the positions of respective bits of a message within a burst so the information content can be determined. Burst, or slot synchronisation involves determining the position within a burst at which a particular bit or string of bits is occurring so that the type of information a particular string of bits contains is known.

Once synchronisation has been achieved the handset sets its internal clock to adopt the same timing as the system clock to enable subsequent transmissions on the located channel to be monitored. It also enables the handset to transmit signals to the system at the appropriate times. To maintain synchronicity with the system and allow the handset to check for incoming calls, amongst other things, the handset will typically monitor the channel periodically, waking before necessary to receive a burst on the channel being monitored, and resynchronising with the transmitted signal to ensure information is correctly received and to compensate for drift between the internal clock of the handset and the system clock. Because of this drift it is important that the point at which the handset 'wakes' to monitor a located channel has a tolerance built in so that the handset does not miss the beginning of a burst as this may give the handset insufficient opportunity to synchronise with a received burst.

The built in tolerance, however, creates a problem as, in order not to miss the beginning of a burst even if there is significant drift between the internal and system clocks the window of time in which the handset looks for a burst on the channel it is monitoring is desirable relatively large. The larger the window, however, the more opportunity for the handset to lock on to a noise signal instead of the synchronisation field of the transmitted burst. If a handset locates a noise signal and locks on to that, the handset will adjust its internal timing to accord with the supposed timing of a system transmitting the noise signal and subsequently be unable to relocate the channel it was monitoring as the internal clock will no longer be compatible with the actual timing of the system. If, on the other hand, the window of time in which the handset looks for the start of a burst is relatively small to reduce the chance of synchronising with noise, the possibility of missing a burst on the channel is increased. If the transmission of a burst is missed on several consecutive occasions the internal clock of the handset may have drifted so far relative to the system clock that it is unable to relocate a burst on the channel it is monitoring. Having lost that channel the handset would have to reinitiate the locking on procedure with the system which both increases power consumption and the chance of missing a call. More apparent to the user would, however, be the loss of an existing call or other communications link.

SUMMARY OF THE INVENTION

In accordance with the present invention there is provided a radio receiver operable for communication in a radio system in which information is transmitted on respective channels in bursts, a burst having a field for enabling the radio receiver to synchronise therewith, the receiver comprising processing means operable in dependence on an adjustable internal clock to synchronise with a received signal, adjustment of the internal clock for synchronisation with a received signal being suspended in dependence on an indication that a received signal is not a transmitted burst.

In contrast with prior art receivers, a receiver in accordance with the present invention is able to suspend adjustment of its internal clock until it has received verification in the form of an error detection field, that a burst has been properly located and received. This avoids the possibility present in prior art systems that by adjusting the timing of the internal clocking mechanism on the basis of synchronisation alone, noise may be mistaken for a burst.

The present invention has the further advantage that by ensuring that the problem of synchronising with noise is substantially reduced, the window in which the receiver receives information in search of a burst can be widened with the improved likelihood of locating the burst. If the receiver is unsuccessful in identifying a burst on a particular occasion, adjustment of the internal clock is suspended and the handset is thus able to attempt to locate another burst on a subsequent cycle with a good chance of success. If, as with prior art arrangements, the internal clock is adjusted each time synchronisation occurs, if the handset synchronises with a detected noise signal, no subsequent attempt at locating the previously a burst on the previous channel would be possible and the receiver would need to identify a new channel on which information was being transmitted once again before information could be received.

The number of attempts at locating a burst that the receiver can miss for embodiments of the present invention is then determined by the accuracy of the internal clock relative to the system clock. If there is little drift between the two clocks, relatively many attempts at receiving a burst can be made without the timing being lost completely. If, however, the drift between the two clocks is larger, fewer attempts at receiving a burst would be possible before the window in which the receiver was looking for the start of a burst no longer encompassed the start of a burst.

In accordance with a second aspect of the present invention there is provided a method of operation of a radio receiver for communication in a radio system in which information is transmitted on respective channels in bursts, a burst having a field for enabling the radio receiver to synchronise therewith, the radio receiver having an adjustable internal clock for synchronising with a received signal, the method comprising suspending adjustment of the internal clock in dependence on an indication that a received signal is not a transmitted burst.

BRIEF DESCRIPTION OF THE DRAWINGS

The invention will be described in more detail with reference to the accompanying drawings of which.

DETAILED DESCRIPTION OF THE INVENTION

In the described example shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset.

Figure 1:
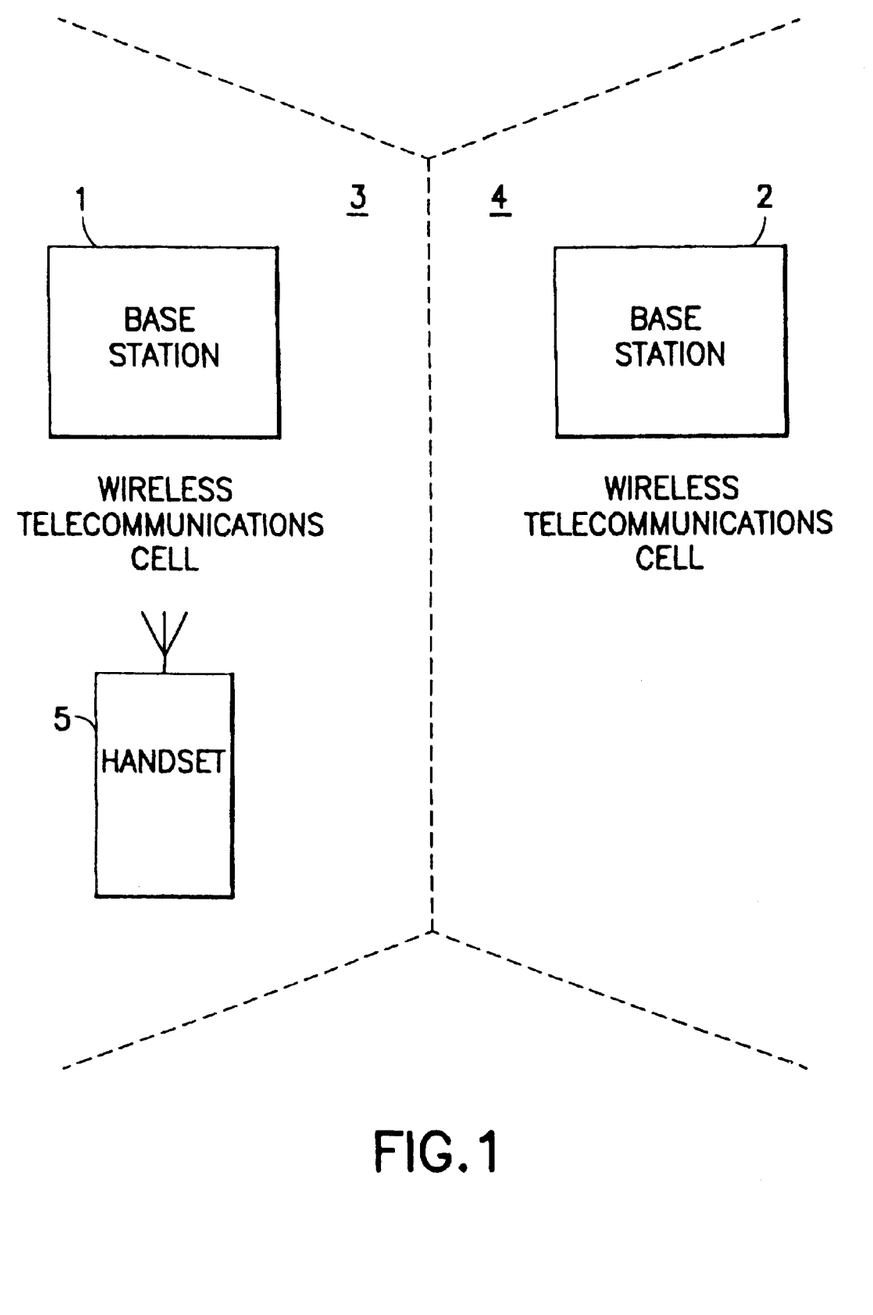
FIG. 1 is a schematic representation a radio telephone system suitable for utilising the present invention.

A DECT system typically includes one or more Fixed Parts (FPs) and several Radio Fixed Parts (RFPs) or base stations 1, 2 supporting respective cells 3, 4. Many portable parts or handsets 5 can use each cell. Each fixed part is physically connected to a standard wireline telephone system, each radio fixed part 1, 2 of a common system is physically connected to the fixed part.

Figure 2:
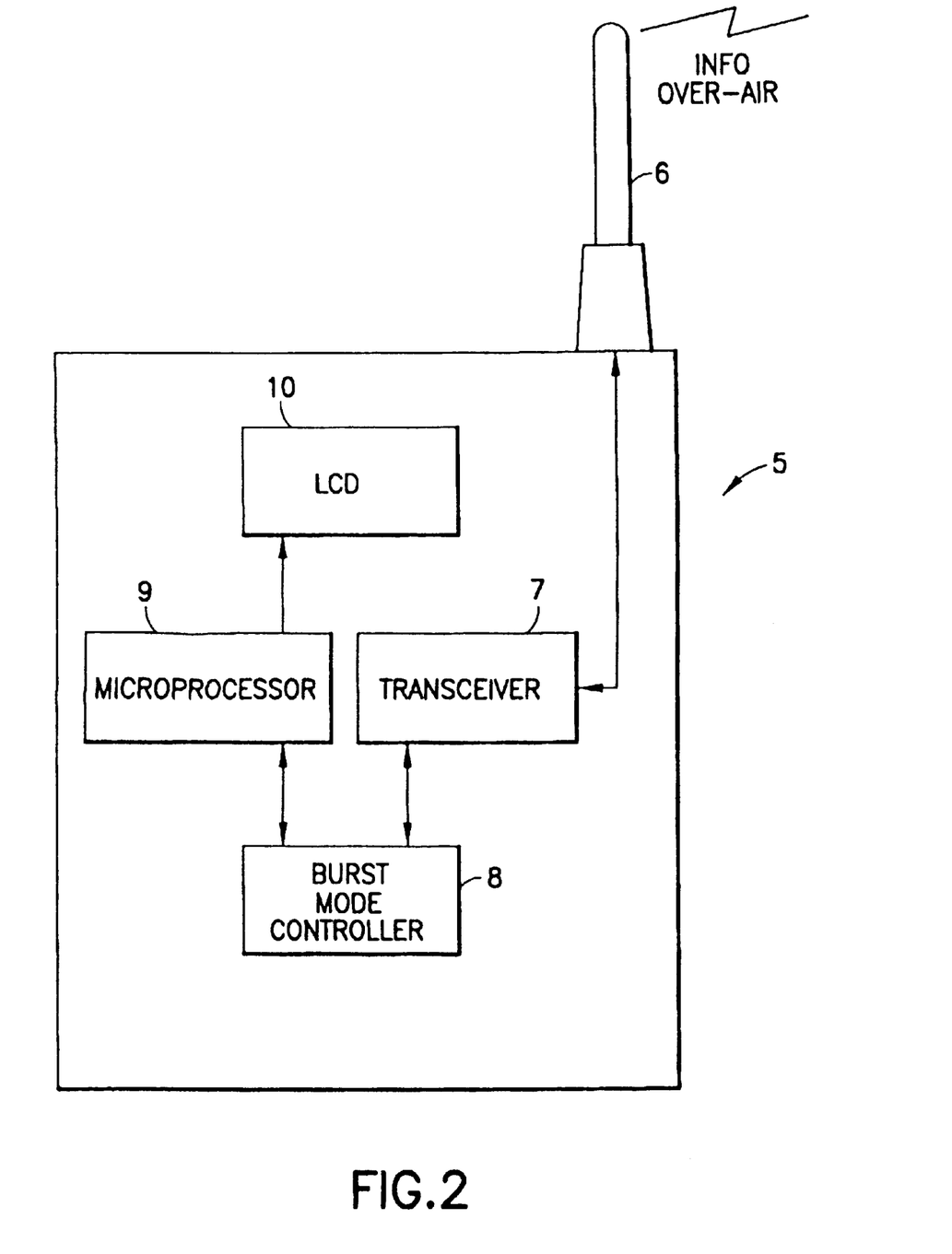
FIG. 2 is a schematic representation of a handset in accordance with the present invention.

Each handset 5 has an antenna 6, a transceiver 7, a burst mode controller 8 including an adjustable clock 8a, processing means 9 programmed with algorithms controlling communication with a base station over a communication channel. Information is displayed on a Liquid Crystal Display (LCD) 10. (FIG. 2).

Figure 3:
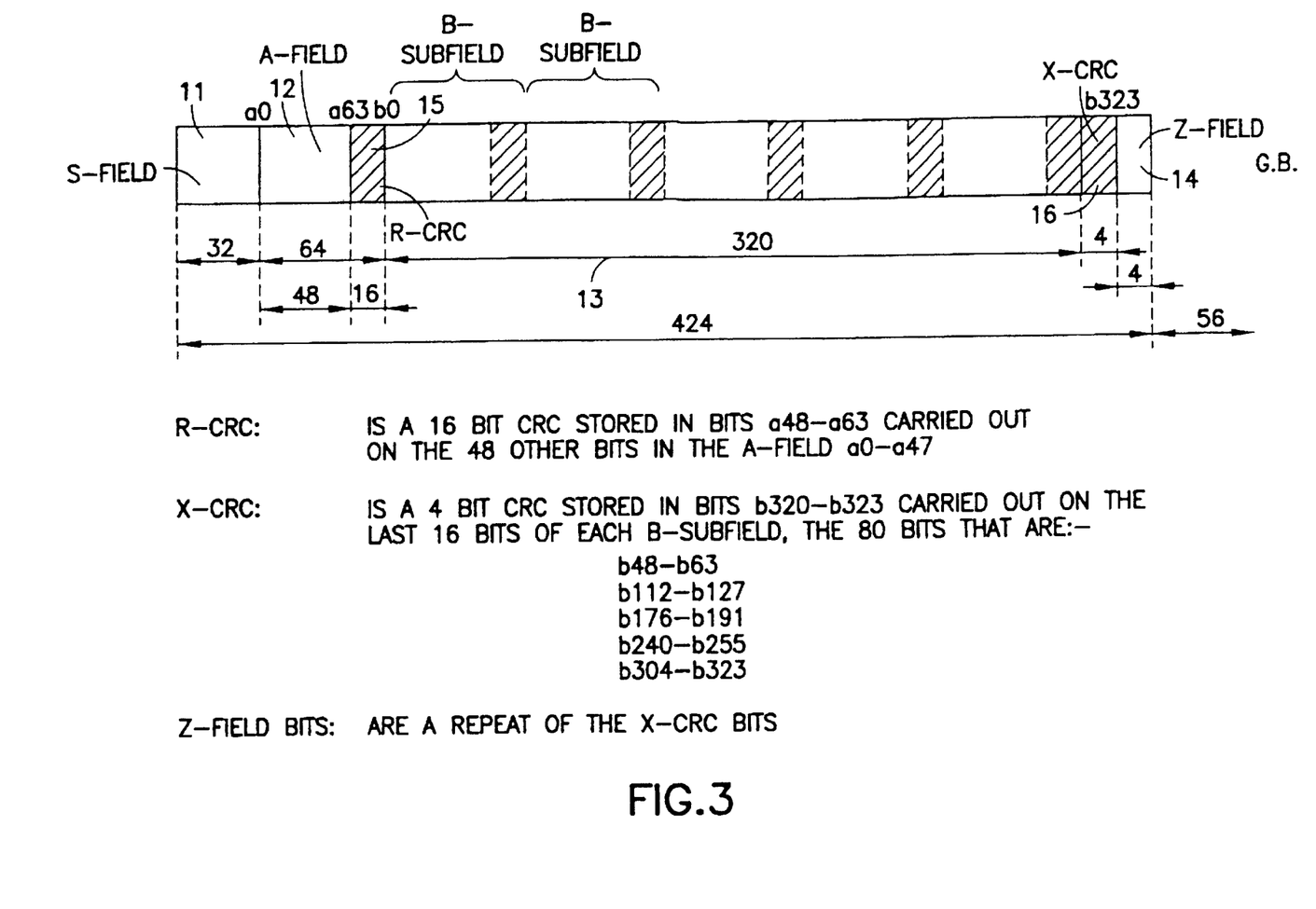
FIG. 3 is a schematic representation of a signal burst under the DECT protocol.

Transmission in one of the time slots of a frame is accomplished by sending a signal burst. Each signal burst is divided into four fields and its structure is illustrated in FIG. 3. The S-field 11 used for synchronisation, and the A-field 12, used to send signalling information in accordance with the DECT protocol are both used when locking on i.e. finding a channel for receiving system information. The B-field 13 is used for sending speech or data to a system user and the Z-field 14 is provided specifically for sliding error detection. In addition to the Z-field, the A and B fields have their own error detection sub-fields known as Cyclic Redundancy Checks (CRCs) R-CRC 15 and X-CRC 16 respectively. The A-field is 64 bits long with the final 16 bits, the R-CRC 15, providing an error check on the preceding 48 bits. The B-field is 320 bits. The 4 bit X-CRC 16 provides an error check on the B-field. The Z-field 14 is a repetition of the X-CRC 16.

Figure 4A:
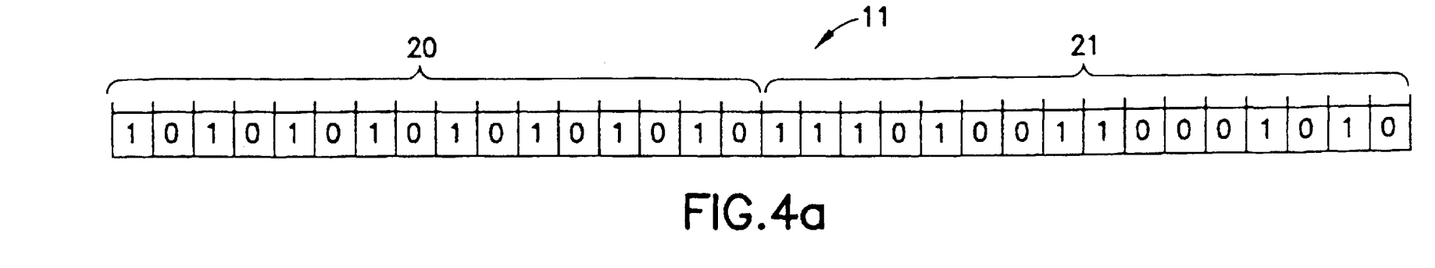
FIG. 4 is a schematic representation of the S-field of the burst of FIG. 5.
Figure 4B:
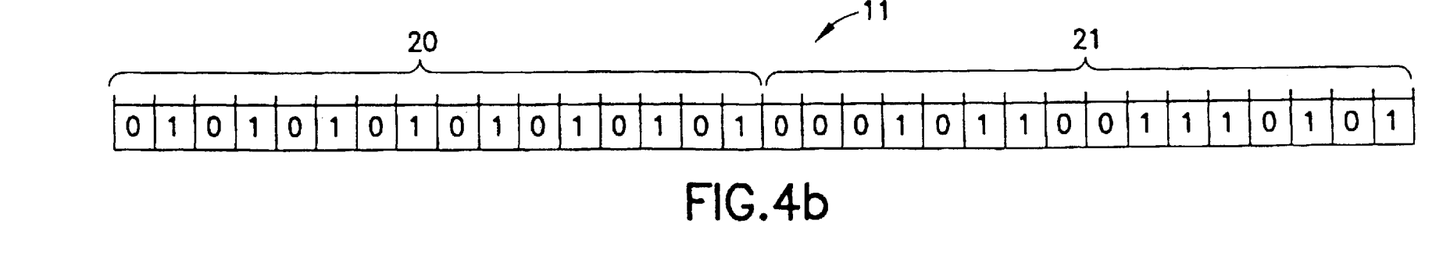

FIG. 4 illustrates the two types of S-field utilised under the DECT standard. One is used in transmissions by the fixed part (FIG. 4a) and the other for transmission by the handset (FIG. 4b). Both S-fields 10 are similar in that they include a preamble portion 20 used for 'lock' recovery, or bit synchronisation, and a synchronisation word 21 used for slot or burst recovery. The preamble in each case is a sequence of zero/one transitions. If the synchronisation word detected is the known synchronisation word, bit synchronisation is confirmed and a known position within the burst has been established. The receiver uses the synchronisation word to locate the beginning of the A-field and the subsequent fields to obtain the information carried by the burst. It is the location of the synchronisation word that allows slot or burst synchronisation to be achieved.

Handsets communicate with a base station via an available over the air communication channel. In order to be able to make or receive a call the handset must be periodically monitoring the system. In this state the handset is said to be in 'idle lock'.

In order to monitor the system periodically it is important for the handset to be able to 'look for' the synchronisation field of a burst at an appropriate time. The handset has an internal clock the timing of which is adjustable when slot synchronisation is achieved with an incoming burst so that it is slot synchronised with the Remote Fixed Part (RFP). This enables the handset to look for a signal transmitted by the system at an appropriate time. In order to cater for some drift between the internal and system clocks the handset must be able to look for the synchronisation field of a burst over a window of time, typically around 12 bits. This window of time will be referred to for the purposes of this specification as the SYNCH window.

Figure 5:
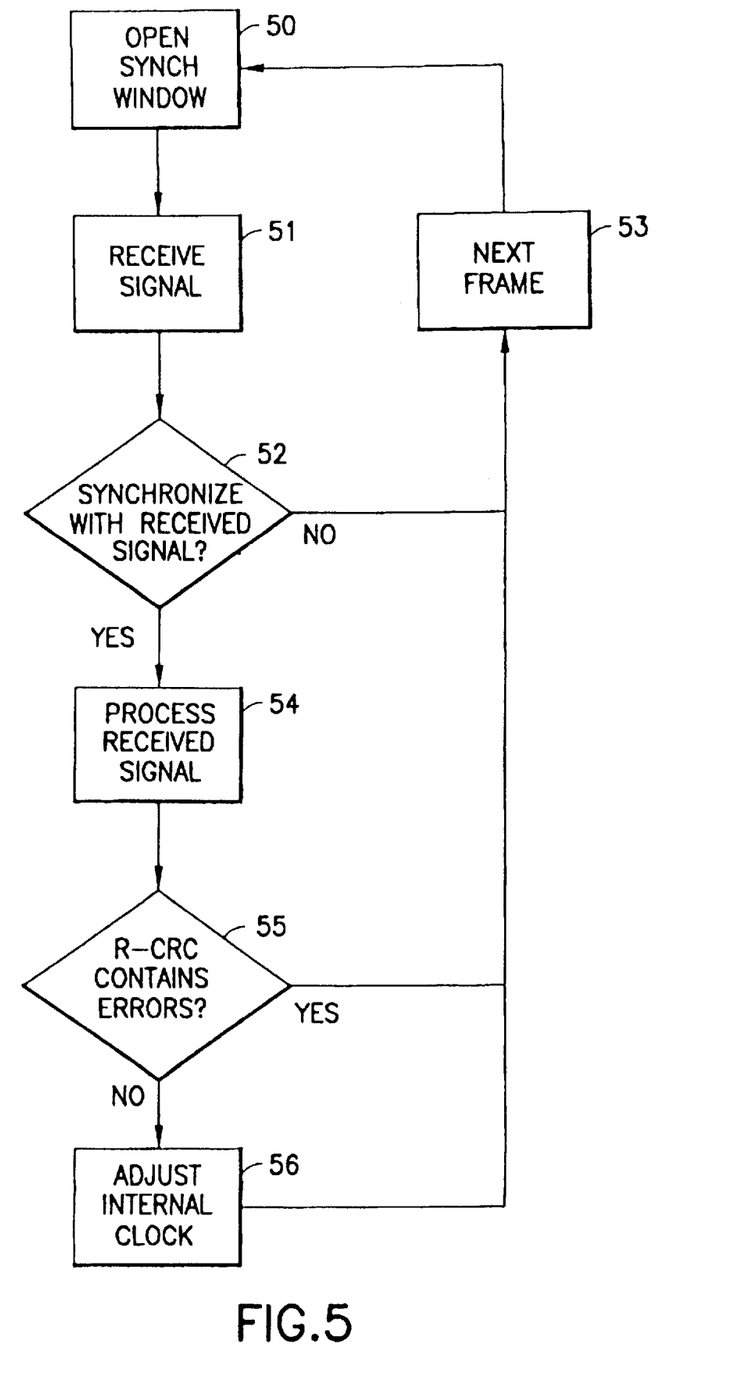
FIG. 5 is a flow chart illustrating operation the handset of a first embodiment of the present invention.

In a first embodiment of the invention, rather than adjusting the timing of the internal clock as soon as slot synchronisation is achieved, the timing is instead adjusted once the A-field has been received and the R-CRC checked for errors. Operation of a handset of this embodiment of the invention is illustrated in FIG. 5. To receive a signal on the channel it is monitoring, the handset opens a SYNCH window 50, receives a signal in the SYNCH window 51 and attempts to synchronise. If synchronisation is not achieved 52 the handset waits to the next frame 53 and reopens the SYNCH window 50 to attempt to find the channel it was monitoring. If bit and slot synchronisation is achieved 52, the received signal is processed 54 and a check made to determine if the R-CRC of the A-field contains errors 55. Other error fields of the burst could be used instead to verify the validity of the burst. The R-CRC is, however, convenient as it is transmitted in the A-field providing system information that would be processed each time the handset receives a burst regardless of whether or not it is in a call or other communications link.

If no errors are indicated by the R-CRC, the internal clock is adjusted 56 and the next frame can then be processed in a similar fashion 53. The internal clock's synchronisation with the channel it is monitoring has been maintained. If the R-CRC indicates an error 55, the step of adjusting the internal clock is missed and the SYNCH window opened 50 in the next frame with the internal clock unadjusted.

This embodiment in accordance with the invention ensures that if the handset has inadvertently synchronised with a noise signal the internal clock is not adjusted so that the handset can open the SYNCH window on the subsequent frame to attempt to synchronise again with the transmitted signal. The internal clock of the handset is not adjusted unless it is confirmed that the signal with which the handset has synchronised is a transmitted burst. No adjustment will, therefore, be made unless it is to fine tune the synchronisation between the internal clock and the system.

By leaving the internal timing of the handset unadjusted unless synchronisation has occurred with a valid signal, the handset has the opportunity to synchronise with a burst in the next frame. If a fast fade or other temporary deterioration in the transmitted signal affects the quality of the channel, the handset will still be in a position to monitor the channel on subsequent frames when the signal quality once more improves. If, however, the internal clock has lost synchronisation with the channel it is monitoring, the handset will need to relocate a suitable channel and lock on again in order to monitor the system.

The handset will not continue to open the same SYNCH window indefinitely as, typically, after failing to synchronise for five or so consecutive frames the handset will handover to a different channel as it is likely that the channel it was monitoring has permanently deteriorated. By delaying adjustment of the synchronisation field, until it has been verified that the signal received is bona fide, the handset is able to attempt to synchronise in the appropriate SYNCH window for a number of frames before it is necessary to request handover if the handset is in a call or to select a different channel to monitor if the handset is in idle lock. This allows the handset to continue to monitor a signal even if there are temporary deteriorations in the received signal quality. Otherwise if the handset is able to lock on to a noise signal, which experiments show can happen surprisingly frequently the internal clock timing of the handset is lost and the handset has to scan through the potential channels until a suitable channel for monitoring is again found. This results in a call-in-progress being lost and the additional locking on activity necessary to reestablish a communication link will deplete battery power. In relation to this and the following embodiment the clock is adjusted for bit synchronisation each time a signal is received. The bit rate clock counter for slot adjustment is, however, adjusted in accordance with embodiments of the invention.

Figure 6:
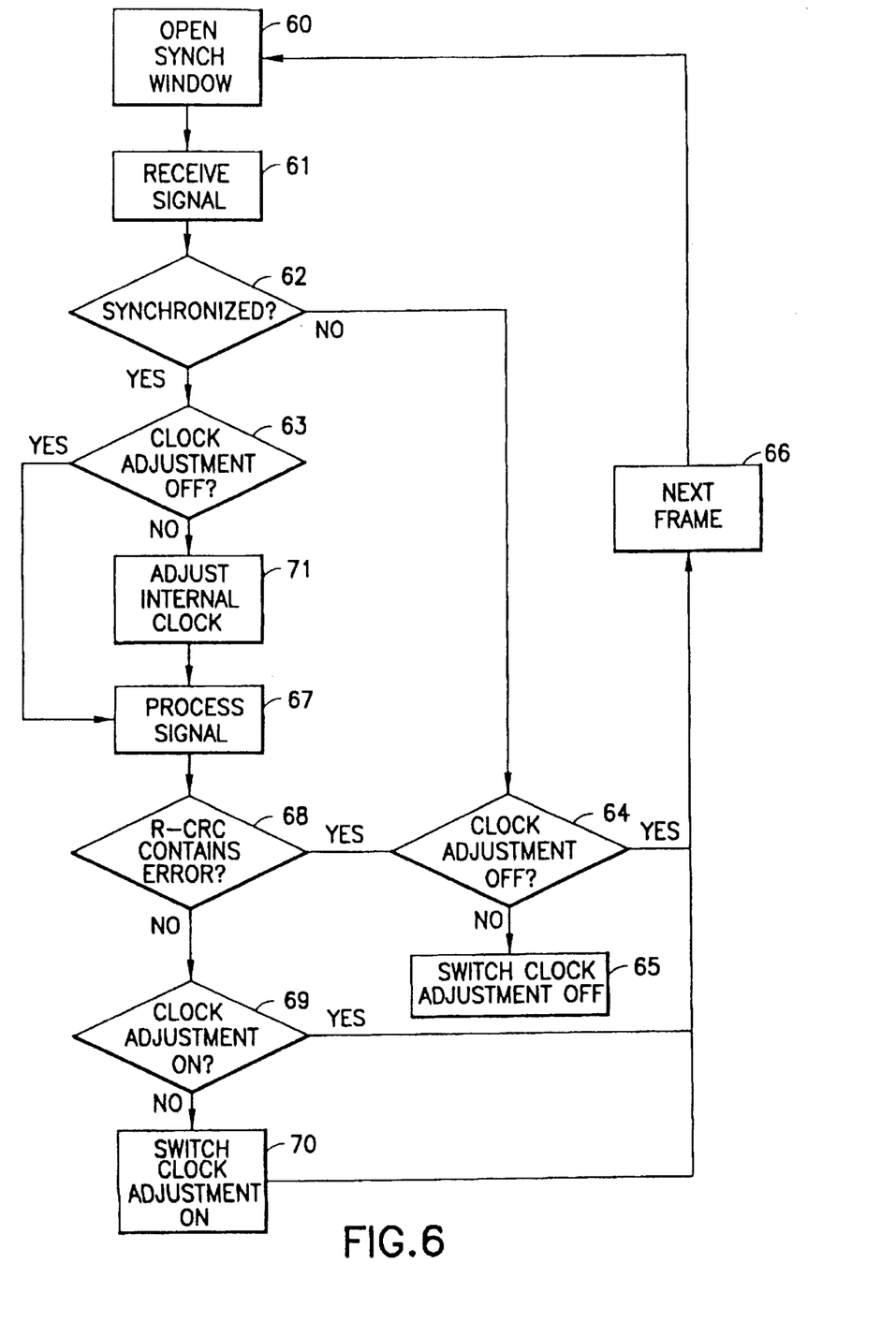
FIG. 6 is a flow chart illustrating operation the handset of a second embodiment of the present invention.

Operation of another embodiment of the invention, is now described with reference to FIG. 6. In this embodiment, the SYNCH window is opened 60, and a signal received 61 in the same way as for the previous embodiment. Similarly, the handset attempts to synchronise with the received signal 62. In this embodiment the clock adjustment cannot be disabled or suspended fast enough for it to effect operation during the current frame, instead if synchronisation is not achieved 62, this is used as an indication that the received signal is experiencing some noise and that on subsequent frames it may be possible for the handset to synchronise with a noise signal. A check is made to see if the clock adjustment is switched off 63. If not a determination is made as to whether the clock adjustment is off 64 and if not it is switched off for the next frame 65,66. This means that for the next frame, no adjustment to the clock will be made.

If synchronisation fails altogether, the internal clock has not been adjusted and so the timing of the internal clock is still tied to the system clock. The same SYNCH window can still be opened in the next frame 66. On the next frame in which synchronisation is achieved 62, a check is made to determine if clock adjustment is off 63. If it is, the signal is processed 67 and the R-CRC of the A-field checked to determine if it contains an error 68. If it does not, this is a good indication that a temporary deterioration in the received signal has passed and the handset will be able to receive the signal again on the next frame. A determination as to whether the clock adjustment is on is made 69 if not the clock adjustment is switched on 70 so that in the next frame, when it is likely for synchronisation to be achieved again 62, the clock adjustment will not be off 63 and the internal clock will be adjusted 71 for better synchronisation with the system. This process will continue for subsequent frames until another synchronisation failure is detected.

Although not providing the full benefit of the previous embodiment, this embodiment provides an advantage over the prior art. It works because the likelihood that the first time a handset experiences noise it is noise that it is able to synchronise with, is in itself small. By switching the adjustment mechanism off when the handset has experienced a failure to synchronise on a first occasion, the handset will not lose its internal clock timing unless two consecutive noise signals allow the handset to synchronise. This is far more unlikely than that one noise signal on its own allowing the handset to synchronise.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention in particular the invention is applicable for use under other protocols other than the DECT protocol including wireless customer premises equipment (WCPE) and Personal Handyphone System (PHS) and not restricted to cordless systems.

What is claimed is:

1. A radio receiver operable for communication in a radio system in which information is transmitted by signals on respective channels in bursts, a burst having a field for enabling the radio receiver to synchronize therewith, the receiver comprising:

an adjustable internal clock; and
   a processor operable to adjust said adjustable internal clock to synchronize with a received signal;
   and wherein the improvement comprises:
      the processor, being operable to adjust said adjustable internal clock to synchronize with the received signal in response to a successful completion of a cyclic redundancy check (CRC) of the received signal; and
      means for suspending synchronization until a second received signal following a signal in which the CRC has failed.

2. A radio receiver according to claim 1 wherein said suspending means suspends adjustment of the adjustable internal clock for the current received signal.

3. A radio receiver according to claim 1 wherein said suspending means suspends adjustment of the adjustable internal clock for a subsequently received signal.

4. A radio receiver according to claim 3 wherein the processor comprises means operable to cease suspension of adjustment of the adjustable internal clock for a subsequently received signal in response to an indication that a portion of the subsequently received signal successfully completes a CRC thus indicating a desired transmitted burst.

5. A radio receiver according to claim 1 wherein the burst also has an error detection field therein for indicating if errors exist in the information carried thereby, and receipt of an error detection field indicating no error is an indication that the received signal is a transmitted burst.

6. A radio receiver according to claim 1 wherein the burst also has an error detection field therein for indicating if errors exist in the information carried thereby, and receipt of an error detection field indicating an error is an indication that the received signal is not a transmitted burst.

7. A method of operation of a radio receiver for communication in a radio system in which information is transmitted by signals on respective channels in bursts, a burst having a field for enabling the radio receiver to synchronize therewith, the radio receiver having an adjustable internal clock for synchronizing with a received signal, the method comprising the steps of:

adjusting the internal clock to synchronize with a received signal in dependence on an indication that a portion of the received signal successfully completes a cyclic redundancy check (CRC) thus indicating a transmitted burst; and suspending adjustment of the internal clock for a subsequently received signal burst in dependence on an indication that the portion of the previously received signal does not successfully complete a cyclic redundancy check (CRC) thus indicating an undesirable signal.

8. A radio receiver according to claim 1 wherein the burst also has a SYNC word that is used to determine synchronization.

9. A radio receiver according to claim 1 wherein the burst also has a Cyclic Redundancy Check that is used to determine when re-synchronization is needed.

10. A method according to claim 7 wherein adjustment of the internal clock is suspended for the current received signal.

11. A method according to claim 7 wherein adjustment of the internal clock is suspended for a subsequently received signal.

12. A method according to claim 11 wherein suspension of adjustment of the internal clock is ceased for subsequently received signals in dependence on an indication that a portion of the subsequently received signal successfully completes a CRC thus indicating a desired transmitted burst.

13. A method according to claim 7 wherein the burst also has an error detection field therein for indicating if errors exist in the information carried thereby, and receipt of an error detection field indicating no error is an indication that the received signal is a transmitted burst.

14. A method according to claim 7 wherein the burst also has an error detection field therein for indicating if errors exist in the information carried thereby, and receipt of an error detection field indicating an error is an indication that the received signal is not a transmitted burst.

15. A method according to claim 7 wherein the burst also has a SYNC word that is used to determine synchronization.

16. A method according to claim 7 wherein the burst also has a Cyclic Redundancy Check that is used to determine when re-synchronization is needed.

17. A radio receiver operable for communication in a radio system in which information is transmitted by signals on respective channels in bursts, a burst having a field for enabling the radio receiver to synchronize therewith, the receiver comprising:

an adjustable internal clock; and processing means, operable to adjust said adjustable internal clock to synchronize with a received signal;

and wherein the improvement comprises:

the processing means, being operable to adjust said adjustable internal clock to synchronize with the received signal in response to a detection of an error free portion of the received signal; and means for suspending adjustment of said adjustable internal clock for a subsequently received signal burst for synchronization with the received signal in response to an indication that the previously received signal is not a transmitted burst.

18. A method of operation of a radio receiver for communication in a radio system in which information is transmitted by signals on respective channels in bursts, a burst having a field for enabling the radio receiver to synchronize therewith, the radio receiver having an adjustable internal clock for synchronizing with a received signal, the method comprising the steps of:

adjusting the internal clock to synchronize with a received signal in dependence on an indication that a portion of the received signal is an error free transmitted burst; and suspending adjustment of the internal clock for a subsequently received signal burst in dependence on an indication that a portion of the previously received signal is not an error free transmitted burst.

19. A radio receiver according to claim 3 wherein the processing means comprises means operable to cease suspension of adjustment of the adjustable internal clock for a subsequently received signal in response to an indication that a portion of the subsequently received signal is error free thus indicating a desired transmitted burst.

20. A method according to claim 11 wherein suspension of adjustment of the internal clock is ceased for subsequently received signals in dependence on an indication that a portion of the subsequently received signal is an error free transmitted burst.

* * * * *